Aug. 6, 1957     T. L. IVESON     2,801,554
SAW FILING FIXTURE
Filed March 29, 1956     2 Sheets-Sheet 1
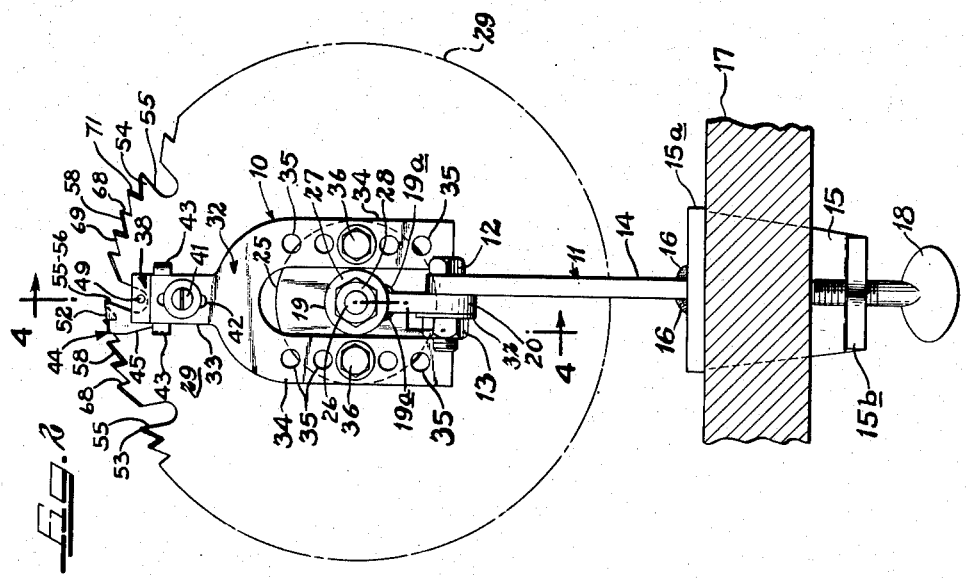
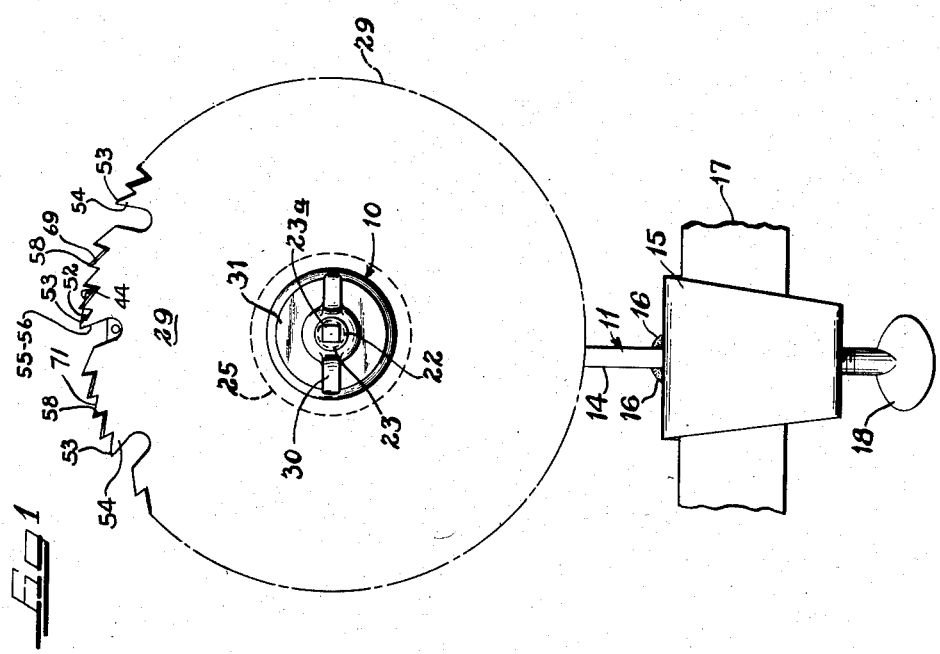
Inventor
Thomas L. Iveson

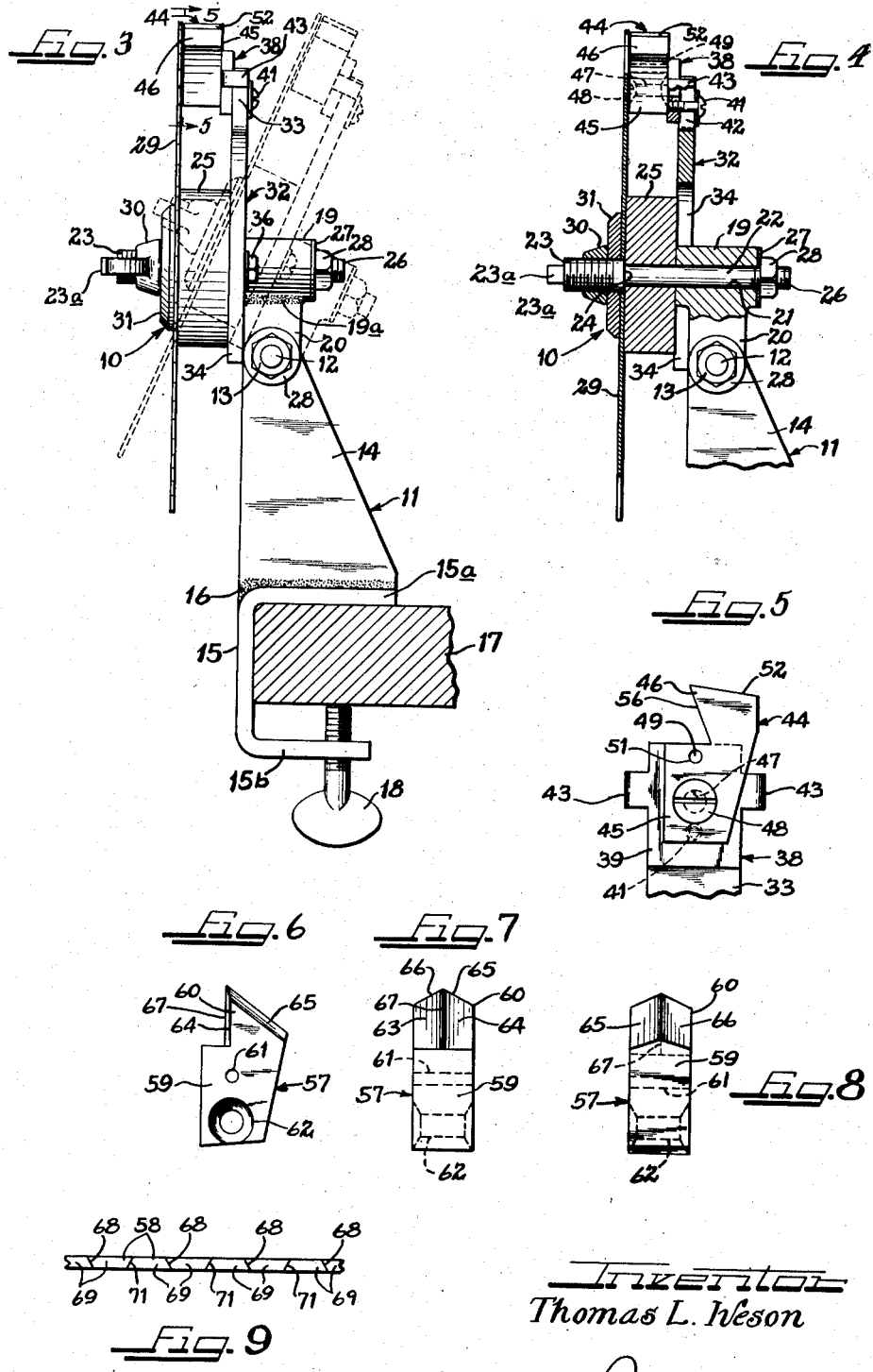

United States Patent Office 2,801,554
Patented Aug. 6, 1957

2,801,554
SAW FILING FIXTURE
Thomas L. Iveson, Aurora, Ill.

Application March 29, 1956, Serial No. 574,754

11 Claims. (Cl. 76—31)

This invention relates to improvements in saw filing fixtures and more particularly to the novel structure of and mounting for a template for supporting and guiding a file or other cutting tool during filing or sharpening operations.

At the present time the filing or sharpening of the teeth of circular saw blades is an expensive operation requiring skill and is too complicated to be performed in a home or small shop. The fixture herein disclosed is especially adapted for use while sharpening relatively small circular saw blades of the so-called portable type and requires no special skill in operation.

An important object of this invention, then, is to provide a novelly constructed circular saw sharpening fixture which may be used efficiently by a workman of only average skill.

Another object of the invention resides in the provision of a novel saw sharpening fixture including a novel template which may be easily and accurately adjusted to accommodate circular saw blades of different diameters.

A further object of the invention resides in the provision of a saw holding fixture with novel means to facilitate quick substitution of various templates required for guiding the file or other tool used to sharpen the various edges of the saw teeth.

A still further object of the invention resides in the provision, in a saw holding fixture, of novel means for adjusting the angular position of a part thereof for ease in carrying out the sharpening operations on the tooth surfaces of circular saw blades mounted thereon.

Still another and further object of the invention is the provision of a saw sharpening fixture and template therefor which is of simple yet rugged construction, easy and inexpensive to manufacture, simple to operate and extremely accurate in operation.

Other and further objects and advantages of the invention will become more apparent from the following description, taken in connection with the accompanying drawings, in which:

Fig. 1 is a front elevational view of the saw filing fixture of this invention, showing a circular saw blade clamped in position thereon;

Fig. 2 is an elevational view similar to Fig. 1, but showing the rear view of the fixture;

Fig. 3 is a side elevational view of the fixture, showing, in dotted lines, one of the positions to which it may be tilted;

Fig. 4 is a fragmental vertical sectional view taken substantially on line 4—4 of Fig. 2, with parts in elevation;

Fig. 5 is an enlarged fragmental face view of one of the filing templates in mounted position, as seen when viewed in the plane indicated by the line 5—5 of Fig. 3;

Fig. 6 is an enlarged front face view of another form of filing template;

Fig. 7 is a side elevational view of the template shown in Fig. 6, as seen from the left;

Fig. 8 is a view similar to Fig. 7, showing the opposite side of the template; and, Fig. 9 is an enlarged fragmentary edge view of a circular saw blade diagrammatically showing relative positions of scorer teeth edges thereon.

Referring now to the accompanying drawings and particularly to Figs. 1, 2 and 3, the saw filing fixture includes an upper fixture portion 10 which is tiltably mounted on a lower portion or support 11 by means of a pivot bolt 12 having a nut 13 thereon by means of which the upper fixture portion may be clamped in a desired work position.

The support 11 includes an upstanding standard 14 having an opening (not shown) at its upper end for receiving the pivot bolt 12. The lower end of the standard 14 is integrally connected to a U-shaped clamp member 15, as by means of welding 16, brazing, or the like. The clamp is so arranged that its side members or arms 15a and 15b are preferably horizontal whereby to mount the support 11 on a table 17, bench or similar base. To removably secure the structure in working position, a thumb screw 18 threadedly engages within an internally threaded opening (not shown) in the clamp arm 15b. When threaded home against a table 17, or other base located between the clamp arms, the support standard 14 is secured firmly in vertical position ready for the attachment of the upper fixture portion 10, which will now be described.

The upper fixture portion 10 includes a boss-like body member 19 having a depending leg 20 integrally secured thereto, as by welding 19a. The leg 19 is suitably apertured at its lower end to receive therethrough the pivot bolt 12 to swingably mount the fixture portion 10 on the standard 14 and lock it thereon in any desired position by the nut 13. The boss-like body member 19 has an axial bore 21 (Fig. 4) for receiving therethrough an arbor 22. The forward end portion 23 of the arbor is enlarged to provide an abutment shoulder 24. A thick spacer 25, axially apertured to receive the shank of the arbor 22, is mounted against and forwardly of the boss-like body member 19 with the shoulder 24 in abutment with its front face. As shown, the rearwardly protruding end 26 of the arbor shank is exteriorly threaded to receive a lock washer 27 and a nut 28. The nut is tightened so as to draw the spacer 25 tightly against the body member 19. The forward end 23 of the arbor is provided with a squared or otherwise formed end 23a for ease in holding the arbor 22 against turning when the nut 28 is threaded home against the washer 27.

A circular saw blade 29, to be sharpened, has an axial mounting opening that fits over the enlarged end 23 of the arbor. It is intended that arbors having front portions 23 of different diameters be made available because the mounting openings of saw blades vary with their overall diameters.

In order to removably secure the blade 29 against the spacer 25, the enlarged end 23 of the arbor is exteriorly threaded to receive a wing nut 30. A washer 31 is fitted over the arbor end 23 ahead of the wing nut so that when said nut is tightened, the washer provides a greater bearing surface against the saw blade. As so arranged, the spacer 25 spaces the saw blade to effect alignment with the filing fixture mechanism or jig now to be described.

The upper fixture portion 10 includes a mounting yoke 32 having a neck 33 and downwardly extending spaced parallel legs 34. A series of mutually spaced holes 35 are provided in each of the legs 34. A pair of diametrically spaced internally threaded holes (not shown) are provided in the back face of the spacer 25. Studs 36, when inserted one through each of a pair of companion holes 35 in the mounting yoke and threaded into the aligned spacer holes, mount the yoke on the spacer 25 with the yoke legs straddling the boss-like member 19. The rows of holes 35 permit the yoke to be mounted in any one of several positions of vertical adjustment to accommodate saw blades of different diameters as will be understood presently.

As best shown in Figs. 3, 4 and 5, a fixture bracket 38 has a substantially square flat body 39 seated against the front face of the neck 33 of the mounting yoke 32. The body is adjustably secured to the yoke by means of a screw 41 carried thereby adjacent its lower end which extends rearwardly through an adjusting slot 42 in the yoke neck. To insure axial alignment of the bracket 38 and the yoke neck on which it is mounted, there is provided on each of its side edges a rearwardly turned ear 43 which together straddle the opposite side edges of the neck. By this construction, the bracket may be vertically adjusted on the yoke neck by loosening and tightening the screw 41, with the parts always remaining in alignment.

A template 44, preferably of tempered stock, shown in Figs. 1 to 5 inclusive, has a body portion 45 and a guide portion 46. The body portion has a hole 47 therein which is countersunk at each of its ends, for receiving a flat-head screw 48 therethrough. This screw threads into a tapped hole (not shown) in the body 39 of the fixture bracket 38 to secure the template to said bracket. As shown in Fig. 5, the head of screw 48 complementally seats in the related conutersunk end of the hole 47 so that the rearwardly disposed face of the saw blade may lie substantially flush against the opposed face of the template. Countersinking both ends of the hole 47 permits reversing the mounting of the template on the bracket 38.

To insure proper alignment of the template on the bracket and to eliminate any inadvertent relative rotation therebetween, the upper end of the bracket 38 carries a forwardly projecting dowel pin 49 (Fig. 4) which extends into an aligned opening 51 (Fig. 5) in the template.

Still referring to Figs. 3, 4 and 5, the upper surface 52 of the template lies in a plane tilted or sloped slightly in the direction of one side edge of the template. This angularity is predetermined and provides a guide upon which to rest a file or other cutting tool while filing the tip 53 of a raker tooth 54 on the saw blade illustrated.

With the template, and its associated parts, adjusted to proper position and secured in place, the saw blade 29 is rotated about the arbor 22 to generally align the forward edge 55 of one of its raker teeth with the inclined forward edge surface 56 of the guide portion of the template 44. The saw blade 29 is then clamped in position by tightening the wing nut 30 against the washer 31. Any vertical adjustment necessary to raise or lower the angular guide surface 52 to align it with a raker tooth is accomplished by first loosening the screw 41. Adjustment along the length of the slot 42 is thereby possible after which the screw 41 is again threaded home.

A file or other cutting tool is drawn back and forth in a horizontal plane across the guide surface 52 and the lip 53 of the associated raker tooth until the latter has been reduced to bring it into horizontal alignment with the surface 52. Similarly, the forward edge 55 of the raker tooth is filed by guiding the file along the forward edge surface 56 of the template. When the edges of the raker tooth have attained the desired sharpness, the saw blade is adjusted about the arbor to position another raker tooth in register with the template and the filing operations are repeated. Adjustment of the saw blade and filing is repeated until all of the raker teeth have been sharpened. This operation not only effects a sharpening of each raker tooth but effects a proper alignment of all similar teeth peripherally of the saw and gives to each raker tooth surface the same angularity with respect to the perimeter of the saw blade.

Figs. 6, 7 and 8 disclose another form of template 57 designed for use while sharpening the scorer teeth 58 of the saw blade 29. This template, also preferably of tempered stock, includes a body portion 59 and a guide portion 60. The template 57 is adapted to be mounted on the previously described fixture bracket 38. The body portion 59 of the template 57 has a hole 61 for receiving the dowel pin 49 and a hole 62 with countersunk ends for receiving the mounting screw 48. The vertical forward edge of the guide portion 60 has two vertically disposed but angularly arranged rearwardly sloping guide surfaces 63 and 64 (Fig. 7). The top edge of the guide portion is formed with a pair of guide surfaces 65 and 66 (Fig. 8) angularly arranged relative to each other, which lie in planes sloping downwardly rearwardly away from the front vertical edge 63—64.

In use, the saw blade 29 is adjusted relative to the template 57 to position the peak edge or ridge 67, between the template surfaces 63 and 64, in alignment generally with a vertical edge 68 of one of its scorer teeth 58. Whichever of the top surfaces 65 and 66 that is disposed in the direction of the saw blade face is aligned with the sloping edge 69 of aligned tooth 58. Vertical adjustment of the fixture bracket 38 may be required to obtain such alignment.

When this adjustment of parts is accomplished, the saw blade 29 and the template 57 are clamped in place and the aligned scorer tooth 58 is then sharpened by drawing a file or other tool along the template guide surfaces closest to the saw blade. For example, when the template is mounted in the position shown in Fig. 6 the guide surfaces used will be 64 and 65, and when the template is reversed the guide surfaces used will be 63 and 66. When the aligned tooth is sharpened, the saw is rotated to locate the next alternate tooth 58 in register with the template and so on around the perimeter of the saw. When all of the alternate teeth 58 are sharpened the saw blade 29 is turned around or reversed on the arbor 22 and the template 57 is likewise turned around or reversed on its mounting. The intermediate teeth 58 not previously sharpened are then filed in the same manner as recited hereinabove. This effects a sharpening of the edges 68 and 69 of alternate teeth 58 in the same general direction angularly of one face of the saw blade. It also effects a sharpening of the corresponding edges 71 and 69 of the intermediate teeth 58 in the same general direction angularly of the other face of the saw blade. This is diagrammatically illustrated in Fig. 9.

It is to be understood, of course, that once the template is properly located, the teeth on the saw blade are sharpened by the movement of the blade on the arbor to successively locate alternate teeth, one after another, in alignment with the template and to clamp the blade during each sharpening operation.

Also, circular saw blades of different diameters may be sharpened in the herein disclosed saw filing fixture by vertically adjusting the wish-bone-shaped mounting yoke 32 for the major adjustment and the fixture bracket 38 for the final adjustment.

In addition, templates with guide surfaces of any desired angularity may be employed.

It is to be understood, however, that although the invention has been described herein more or less precisely as to details, the invention is not to be limited thereby, as changes may be made in the arrangement and proportion of parts, and equivalents may be substituted, without departing from the spirit and scope of the invention.

I claim:

1. A sharpening fixture for a circular saw blade comprising a mounting element including an upstanding standard, a body mounted on said standard, an arbor mounted in said body, means removably clamping a saw blade on said arbor in selected position of rotatable adjustment, a spacer on the arbor between the saw blade and body, a mounting plate mounted on the spacer for adjustment relative to said arbor, said plate extending radially from the axis of the arbor, a bracket adjustable on the mounting plate, a template carried by the bracket, said template including edge surfaces for guiding a sharpening tool over related edges of a saw tooth aligned with said surfaces, and the template being adjustable relative to the periphery of the saw blade.

2. A sharpening fixture for a circular saw blade comprising a mounting element including an upstanding standard, a body mounted for rotatable adjustment in a vertical plane on said standard, an arbor mounted in said body, means removably clamping a saw blade on said arbor in selected position of rotatable adjustment, means spacing the saw blade from the body, a mounting plate on said means for adjustment relative to said arbor, a fixture bracket adjustable on the mounting plate, a template carried by the bracket, said template including surfaces for guiding a sharpening tool over related edges of a saw tooth aligned with said surfaces, and the template being adjustable relative to the periphery of the saw blade.

3. A sharpening fixture for a circular saw blade comprising a mounting element including an upstanding standard, a body mounted for rotatable adjustment in a vertical plane on said standard, an arbor mounted in said body, means removably clamping a saw blade on said arbor in a selected position of rotatable adjustment, a spacer on the arbor between the saw blade and body, a mounting plate adjustable relative to said arbor, a bracket adjustable longitudinally on the mounting plate, and a template carried by the bracket, said template including edge surfaces for guiding a sharpening tool over related edges of a saw tooth aligned with said surfaces.

4. A sharpening fixture for a circular saw blade comprising a body, an arbor on said body for rotatably mounting a saw blade, means removably clamping said saw blade on the arbor in selected positions of rotatable adjustment, a template, and means including a spacer on the arbor and a bracket adjustably mounted on said spacer mounting the template on the body for adjustment radially relative to the toothed periphery of said saw blade, said template having surfaces for guiding a sharpening tool over related edges of a saw tooth aligned with said surfaces.

5. A sharpening fixture for a circular saw blade comprising a body, an arbor on said body for rotatably mounting a saw blade, means removably clamping said saw blade on the arbor in selected positions of rotatable adjustment, a spacer on said arbor between the body and saw blade, a yoke mounted for adjustment on said spacer, a template, and means mounting the template on the yoke for adjustment radially relative to the toothed periphery of the saw blade.

6. A sharpening fixture of the kind recited in claim 5, in which the means mounting the template on the yoke comprises a bracket secured to the template and adjustably connected to the yoke.

7. A sharpening fixture of the kind recited in claim 5, in which the means mounting the template on the yoke comprises a bracket slidable on the yoke and clamp means to secure the adjusted bracket.

8. A sharpening fixture for a circular saw blade comprising a body, an arbor on said body for rotatably mounting a saw blade, means clamping the saw blade on the arbor in selected positions of rotatable adjustment, a spacer on the arbor, a bracket mounted on said spacer, a template mounted on said bracket, said bracket being adjustable relative to the arbor to adjust the position of the template relative to the toothed periphery of the saw blade, and said template having angularly disposed surfaces for guiding a sharpening tool over related edges of a saw tooth aligned with said surfaces.

9. A sharpening fixture for a circular saw blade comprising a mounting element including a standard, a body mounted for rotatable adjustment on said standard, an arbor mounted in said body, means removably clamping a saw blade on said arbor in a selected position of rotatable adjustment, a mounting plate adjustable relative to said arbor, a bracket adjustable longitudinally on the mounting plate, and a template carried by the bracket, said template including edge surfaces for guiding a sharpening tool over related edges of a saw tooth aligned with said surfaces.

10. A sharpening fixture for a circular saw blade comprising a mounting element, a body on said element, an arbor mounted in said body, means removably clamping a saw blade on said arbor in a selected position of rotatable adjustment, a mounting plate adjustable relative to said arbor, a bracket adjustable longitudinally on the mounting plate, and a template carried by the bracket, said template including edge surfaces for guiding a sharpening tool over related edges of a saw tooth aligned with said surfaces.

11. A sharpening fixture for a circular saw blade comprising a body, an arbor on said body for rotatably mounting a saw blade, means removably clamping said saw blade on the arbor in selected positions of rotatable adjustment, a spacer on said arbor, a bracket mounted for adjustment on said spacer, a template, and means mounting the template on the bracket for adjustment radially relative to the toothed periphery of the saw blade.

References Cited in the file of this patent

UNITED STATES PATENTS

| | | |
|---|---|---|
| 2,429,292 | Ouellet | Oct. 21, 1947 |
| 2,770,152 | Davis | Nov. 13, 1956 |